(12) United States Patent
Kincaid

(10) Patent No.: US 7,318,310 B2
(45) Date of Patent: Jan. 15, 2008

(54) SHUTTLE AUGER FOR CONTINUOUS HARVESTING OF MULTI-CROP RESEARCH PLOTS

(75) Inventor: Delmar Kincaid, Hutchinson, KS (US)

(73) Assignee: Kincaid Equipment Manufacturing, Inc., Haven, KS (US)

( * ) Notice: Subject to any disclaimer, the term of this patent is extended or adjusted under 35 U.S.C. 154(b) by 0 days.

(21) Appl. No.: 11/199,612

(22) Filed: Aug. 9, 2005

(65) Prior Publication Data

US 2007/0033913 A1    Feb. 15, 2007

(51) Int. Cl.
*A01D 34/00*    (2006.01)
(52) U.S. Cl. ......................................... 56/14.6; 56/16.5
(58) Field of Classification Search ............... 56/320.1, 56/320.2, DIG. 5, 14.6, 16.5; 460/84, 119, 460/79, 80, 114
See application file for complete search history.

(56) References Cited

U.S. PATENT DOCUMENTS

| | | | |
|---|---|---|---|
| 3,772,862 A | 11/1973 | Wilson | |
| 3,798,884 A | 3/1974 | Middleton | |
| 3,930,354 A | 1/1976 | Borderie | |
| 4,177,628 A | 12/1979 | Brandt | |
| 4,209,918 A | 7/1980 | Klein | |
| 4,218,864 A | 8/1980 | Allemeersch et al. | |
| 5,664,402 A | 9/1997 | Sandvik et al. | |
| 5,957,773 A | 9/1999 | Olmsted et al. | |
| 6,339,917 B1 | 1/2002 | Dillon et al. | |
| 6,848,243 B2 | 2/2005 | Carr et al. | |
| 2006/0046801 A1* | 3/2006 | Argetsinger et al. | .......... 460/59 |

\* cited by examiner

*Primary Examiner*—Thomas B. Will
*Assistant Examiner*—Alicia Torres
(74) *Attorney, Agent, or Firm*—Hovey Williams LLP

(57) ABSTRACT

A combine header is disclosed that comprises a shiftable gate which either permits or blocks passage of grain to a particular portion of the combine. The combine header allows for continuous harvesting of multicrop research and test plots without commingling different grain varieties.

16 Claims, 8 Drawing Sheets

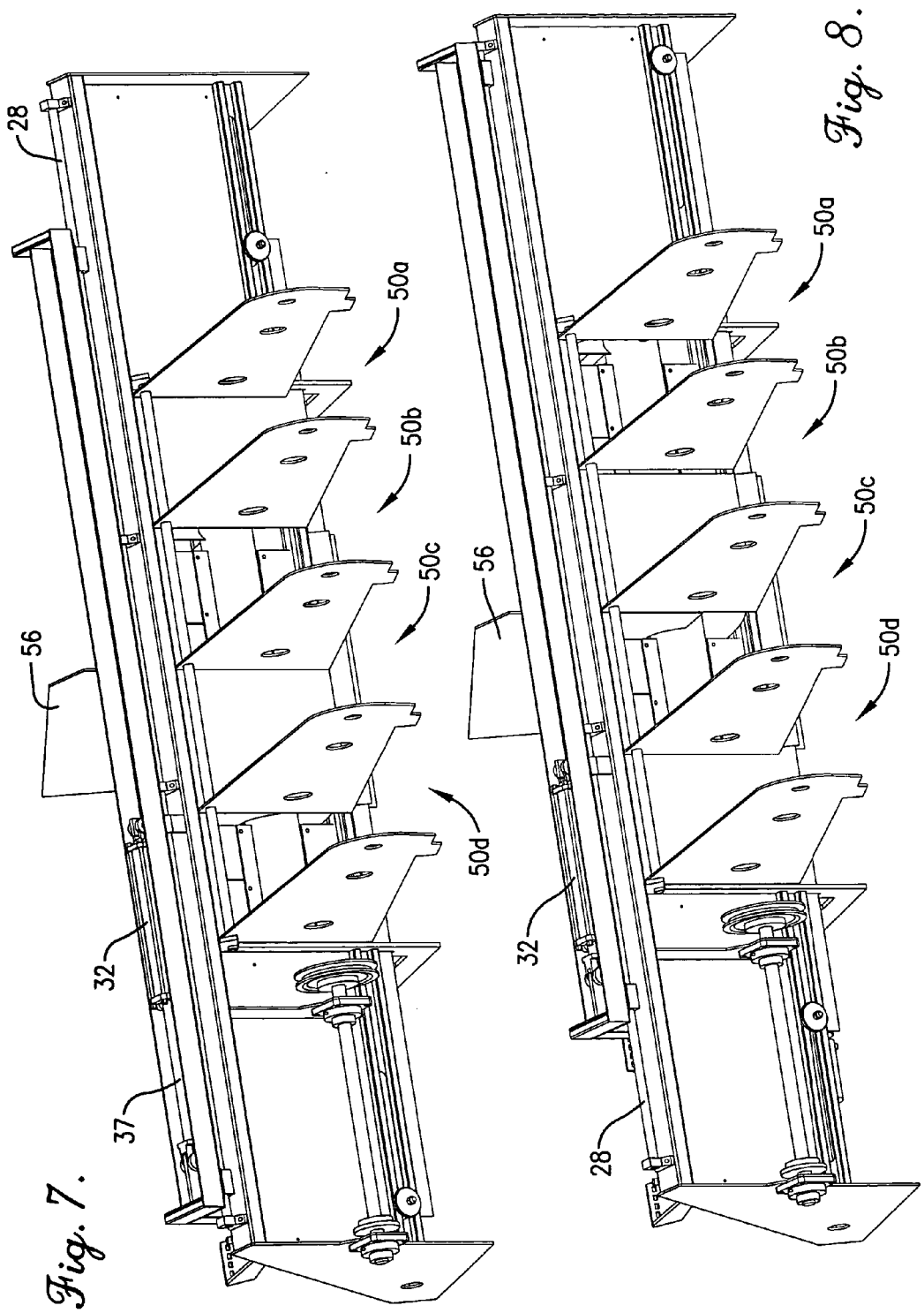

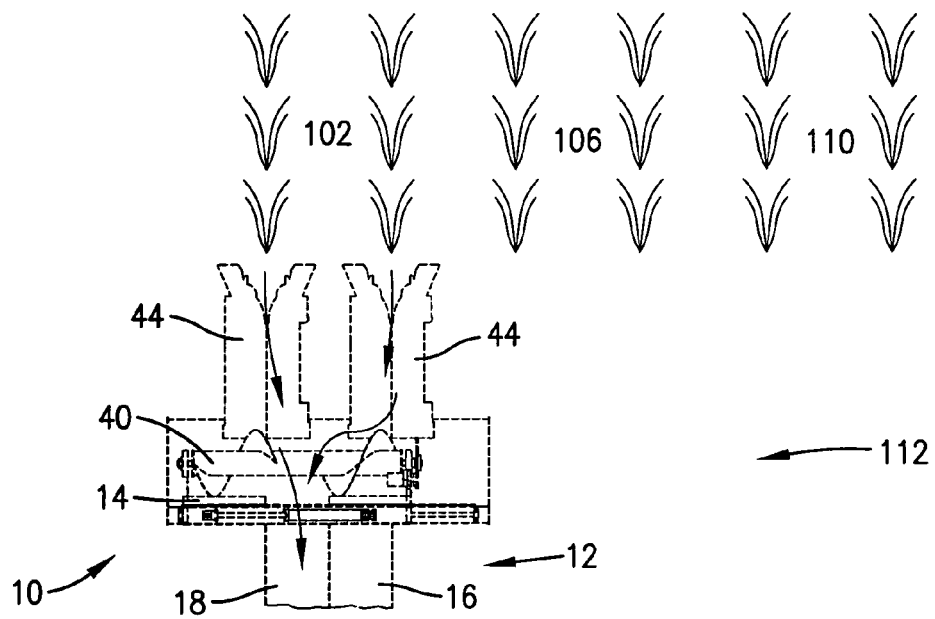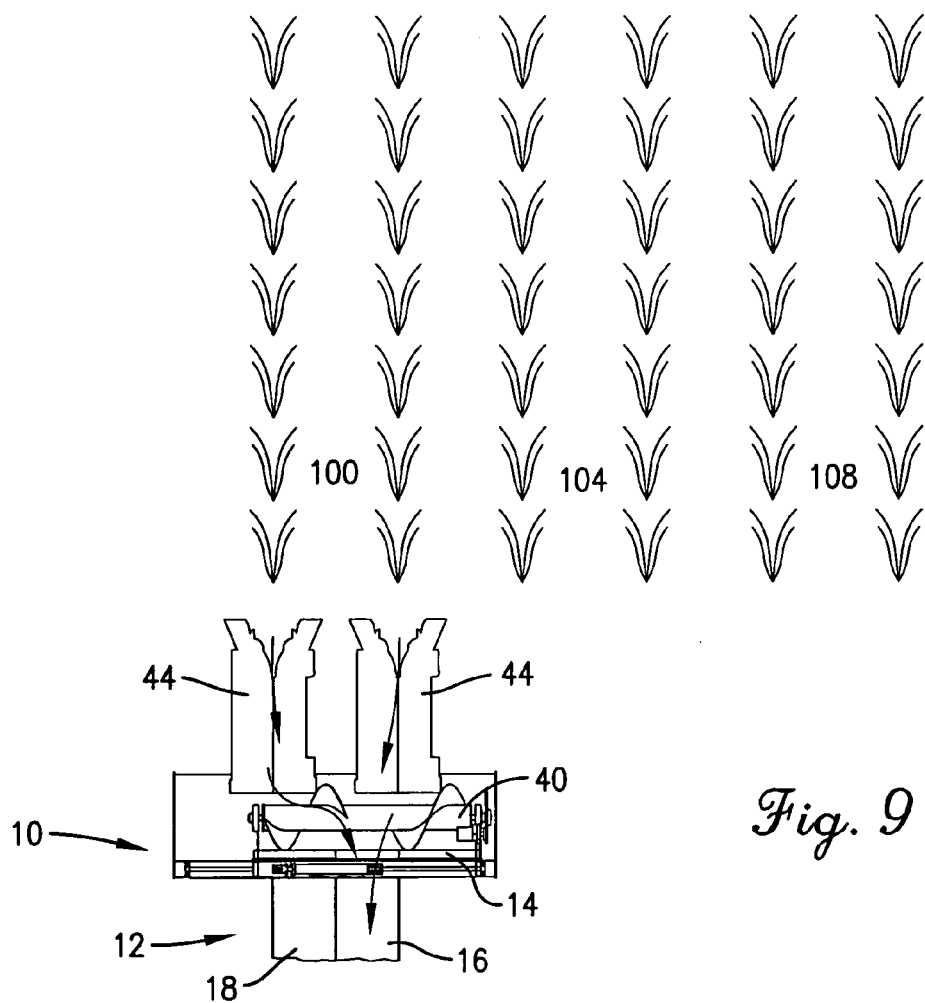
Fig. 9

SHUTTLE AUGER FOR CONTINUOUS HARVESTING OF MULTI-CROP RESEARCH PLOTS

BACKGROUND OF THE INVENTION

1. Field of the Invention

The present invention is directed toward a combine header unit and methods of harvesting using the same. More specifically, the combine header includes a feederhouse that is divided into a plurality of passages and a shuttle gate positioned in front of the feederhouse for selectively blocking access to a particular passage and directing the harvested grain to an unobstructed passage.

2. Description of the Prior Art

It is a common practice to plant numerous test and research grain plots within a single field. Generally, these test plots are planted in parallel rows with a dedicated alley to separate each of the individual grain plots. A variety of grains may be planted within these rows. It is imperative that the grain varieties be separately contained during harvesting to ensure accurate classification of the grain properties, like moisture content, grain temperature, protein content, oil content, density, and weight.

To ensure this separation, existing techniques require a combine operator to pause forward movement through the field upon reaching an alley to allow the grain from the previous plot to "clean-out" of the system, to be weighed, bagged and identified. This stop and go movement upon reaching an alley places a significant amount of stress on the machine and its operator and also accounts for a significant amount of the overall time spent harvesting the grain.

Therefore, there is a need in the art for apparatus and methods of harvesting test and research grain plots in a continuous manner thereby reducing the wear on the harvesting machine and reducing the time required to harvest a given number of plots thus and preventing operator fatigue.

SUMMARY OF THE INVENTION

The present invention overcomes the above problems by providing apparatus and methods for harvesting multi-crop research plots efficiently without having to halt forward progress of the combine or stop, impede or slow the movement of any internal component of the combine.

In one embodiment of the present invention there is provided a combine header comprising: a feederhouse assembly that is divided into at least first and second passages; a rotatable auger; and a shiftable gate slidably mounted on the header aft of the auger and forward of the feederhouse, the gate shiftable between a first position wherein the gate covers the first feederhouse passage so as to block access to the first passage and a second position wherein the gate covers the second passage leaving the first passage uncovered.

In another embodiment of the present invention there is provided a method of harvesting grain from a plurality of plots separated by alleyways comprising the steps of: (a) passing a combine through a first plot, the combine including a header comprising a feederhouse assembly that is divided into at least first and second passages, a rotating auger, and a shiftable gate slidably mounted on the header aft of the auger and forward of the feederhouse, the gate being in a first position blocking access to the first passage; (b) shifting the gate from the first position to a second position upon reaching an alleyway separating the first plot from a second plot, the gate in the second position blocking access to the second passage and unblocking the first passage; (c) passing the combine through the second plot; and (d) repeating steps (a)-(c) a plurality of times.

In yet another embodiment of the present invention there is provided in combination: a combine; and a combine header comprising a feederhouse assembly that is divided into at least first and second passages, a rotatable auger, and a shiftable gate slidably mounted on the header aft of the auger and forward of the feederhouse, the gate shiftable between a first position wherein the gate covers the first feederhouse passage so as to block access to the first passage and a second position wherein the gate covers the second passage leaving the first passage uncovered.

BRIEF DESCRIPTION OF THE DRAWINGS

FIG. 7 is a rear perspective view of the combine header of FIG. 6.

FIG. 8 is a rear perspective of the combine header with the gate shifted to a second position.

FIG. 9 depicts the operation of a combine header in a field containing several test plots.

DETAILED DESCRIPTION OF THE PREFERRED EMBODIMENT

The following description sets forth preferred combine headers and methods of harvesting grain plots using the headers in accordance with the present invention. It is to be understood, however, that these exemplary apparatus and methods are provided by way of illustration and nothing therein should be taken as a limitation upon the overall scope of the invention.

Figure 1:
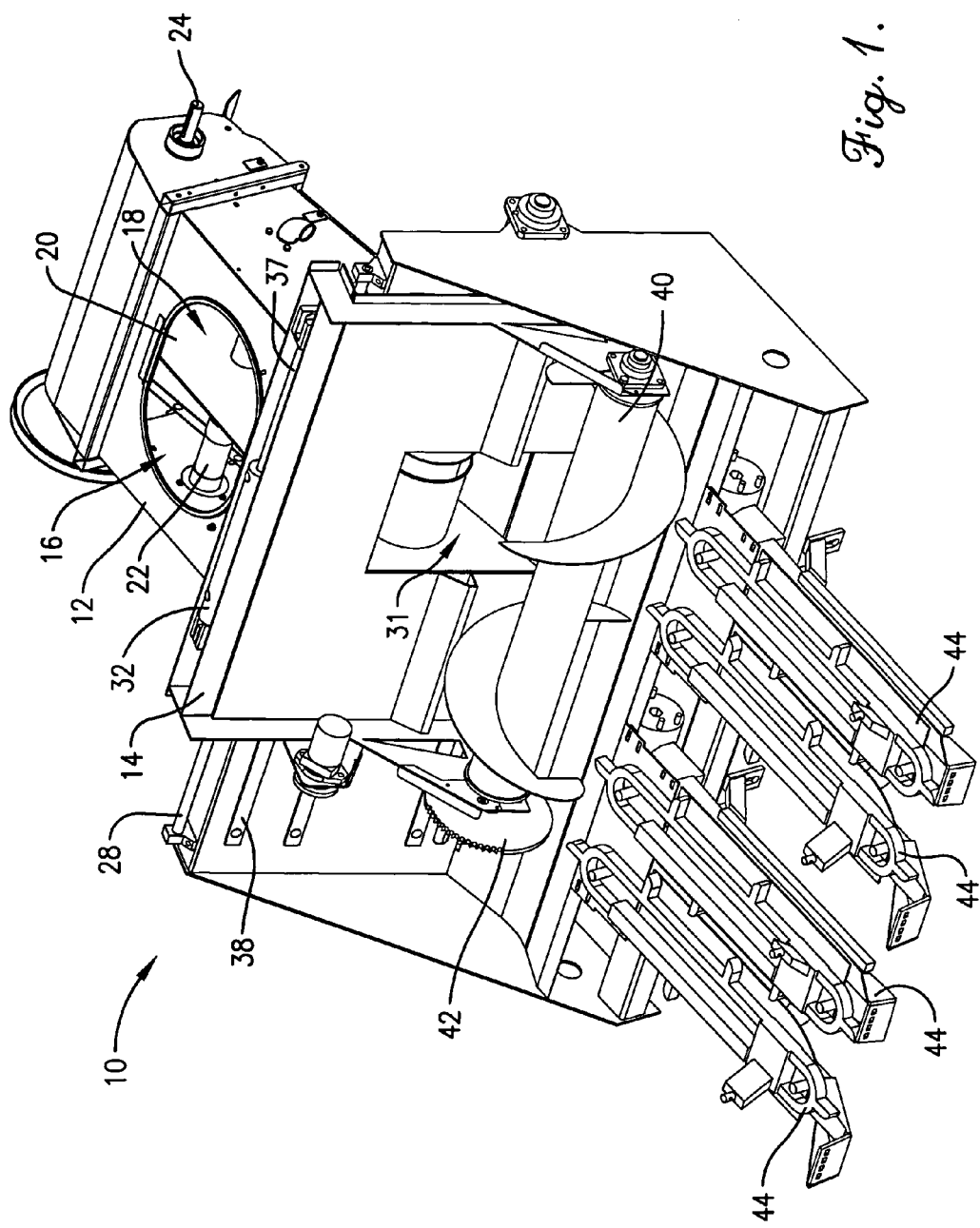
FIG. 1 is a front perspective view of a two-row combine header in accordance with the present invention with the gate directing grain through the left side of the feederhouse assembly.

Turning first to FIG. 1, there is provided a two-row combine header 10 comprising a feederhouse 12 and a horizontally shiftable shuttle gate 14. Feederhouse 12, used for transferring grain from the header 10 to threshing section of the combine, is divided into two functionally equivalent sections, or passages, 16 and 18 by partition 20. By "functionally equivalent," it is meant that both passages operate in approximately the same manner with approximately the same capacity. Various shafts 22, 24 related to the header or other combine operations may extend between sections 16 and 18 through orifices 26 (see, FIG. 3 with the outer feederhouse housing removed for ease of illustration) formed in partition 20. However, partition 20 effectively separates passages 16 and 18 so that harvested grain cannot cross over from one section to another.

Figure 3:
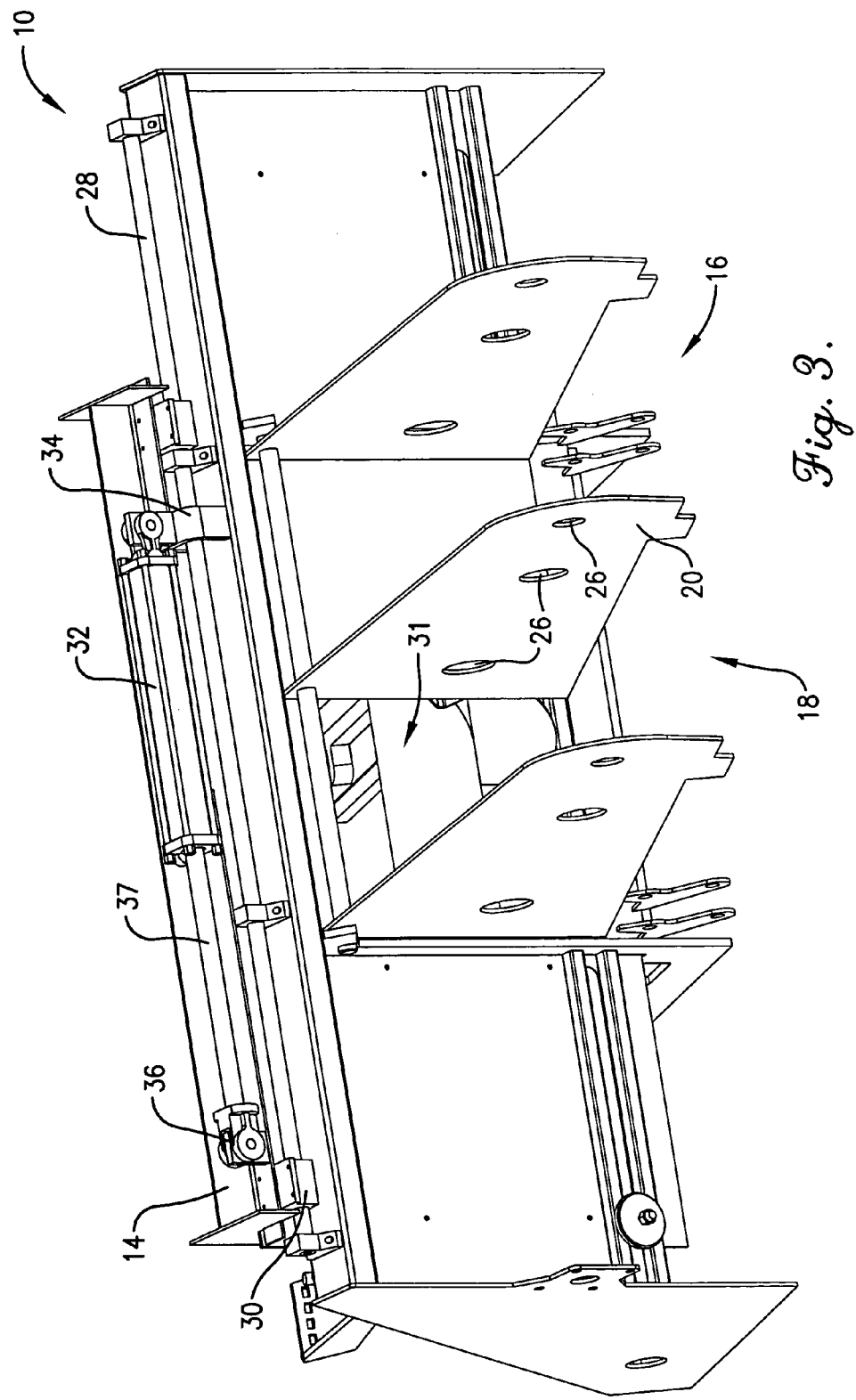
FIG. 3 is a rear view of the header of FIG. 1.
Figure 4:
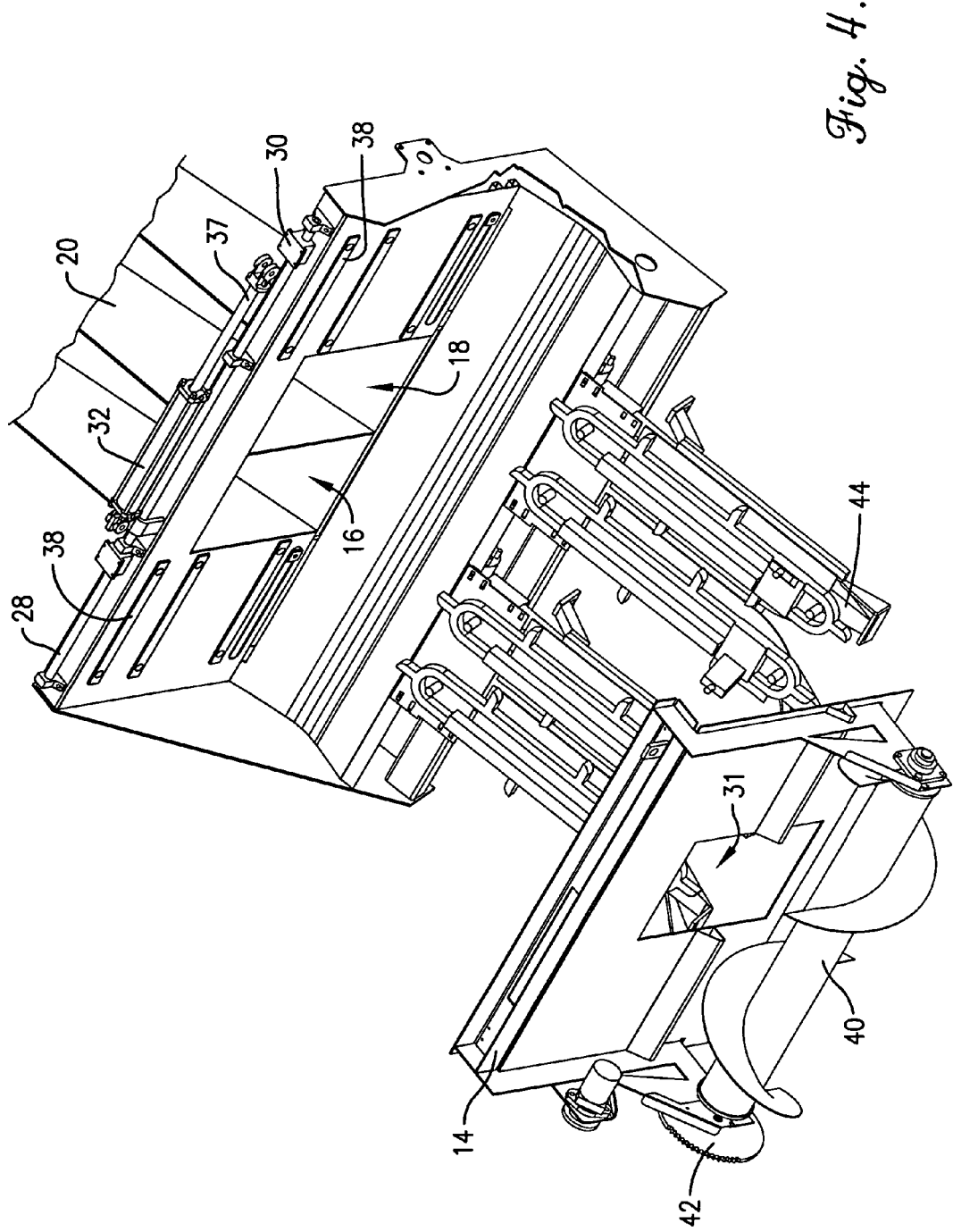
FIG. 4 is a front perspective view of the header of FIG. 1 with the gate exploded forward.

Gate 14 is slidably coupled to header 10 through bearing rod 28. As shown in FIG. 3, gate 14 includes a pair of slide bearings 30 through which rod 28 passes. Bearings 30 are free to slide along rod 28 so that the position of gate 14 can be horizontally shifted relative to header 10. Alternate methods of slidably attaching gate 14 to header 10 are contemplated and could be substituted for the system shown. For example, a roller and track system could be employed in place of the rod and bearing system shown. Gate 14 presents an opening 31 therein which is preferably sized and shaped so as to correspond with passages 16 and 18.

Figure 2:
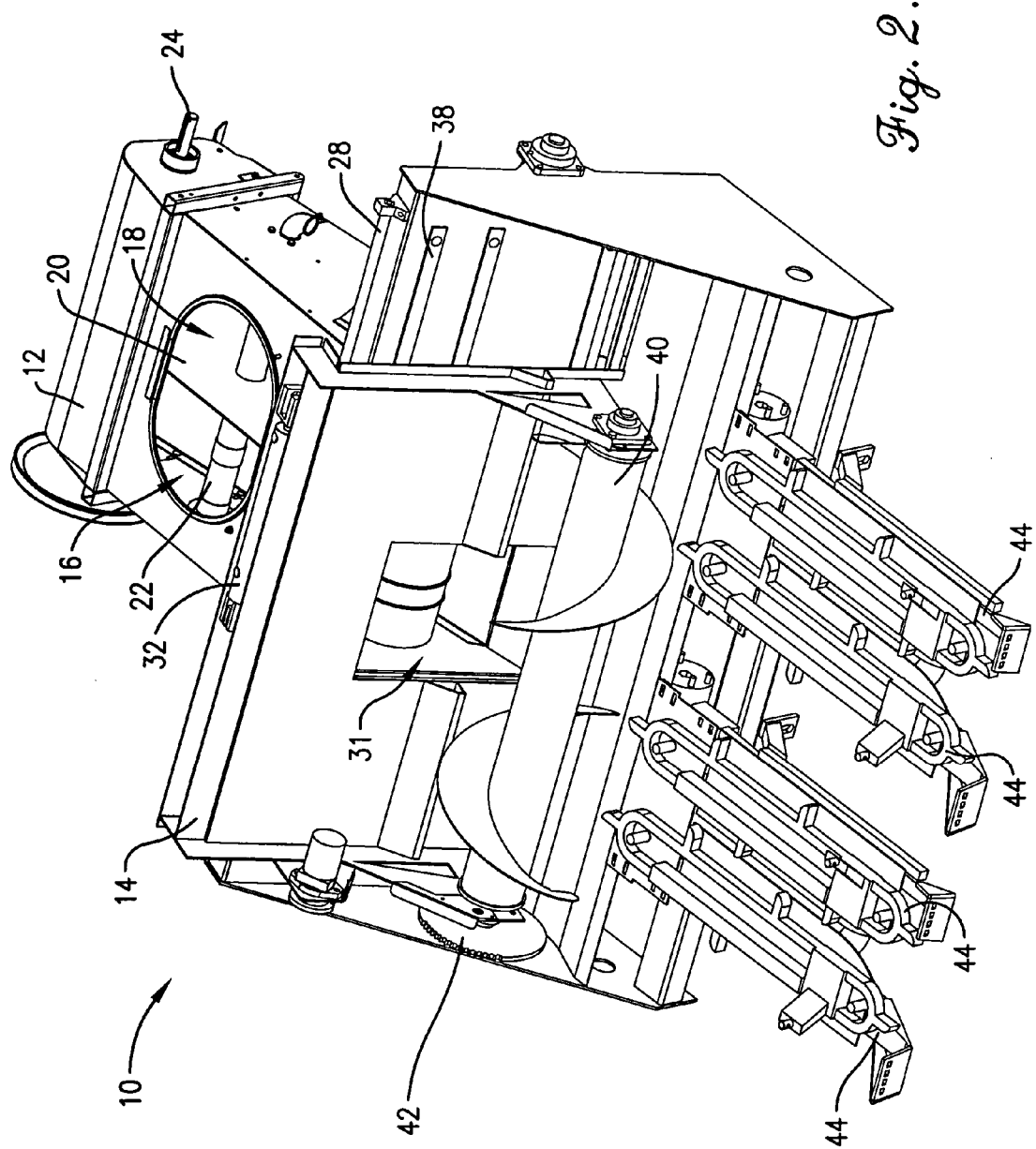
FIG. 2 is a front perspective view of the combine header with the gate shifted for directing grain through the right side of the feederhouse assembly.

Gate 14 further includes a cylinder 32 for effecting horizontal movement of the gate relative to header 10. Cylinder 32 is preferably hydraulicly actuated or can be operated by compressed air or any other means known to those skilled in the art. One end of cylinder 32 is fixedly attached to header 10 by bracket 34, the opposite end is attached to gate 14 by bracket 36. As shown in FIG. 1, gate 14 is positioned so that the gate opening 31 is aligned with feederhouse passage 18. In this position, gate 14 allows the delivery of harvested grain to feederhouse passage 18 and effectively blocks all access to passage 16 so that substantially no harvested grain may enter. Cylinder 32 can be actuated to retract rod 37 thus causing gate 14 to shift to the position shown in FIG. 2. In this position, opening 31 is aligned with passage 16 thereby permitting harvested grain to be directed through passage 16 into the combine. Gate 14 then covers passage 18 prohibiting grain from entering. Gate opening 31 may be lined with a rubber or bristled seal that cooperates with partition 20 to ensure that no grain enters the blocked feederhouse passage.

Figure 5:
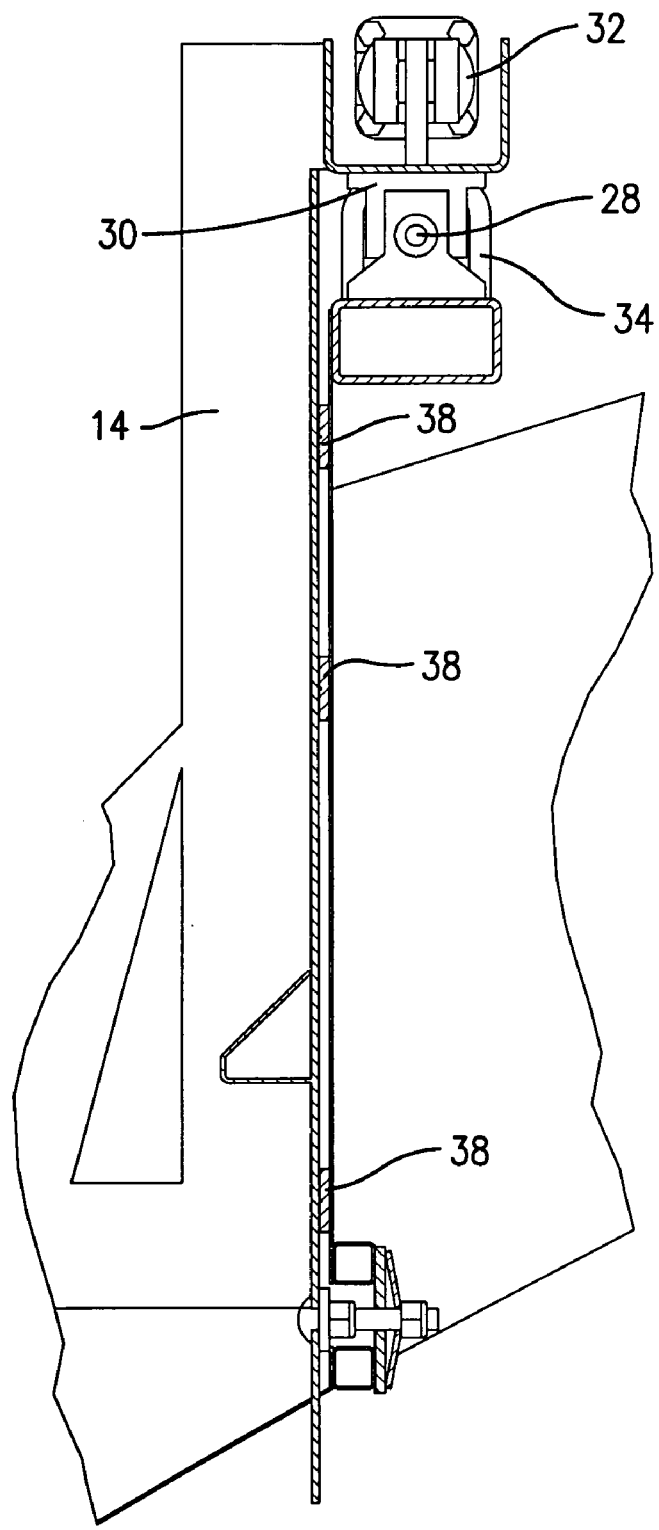
FIG. 5 is side cross-sectional view of the gate assembly.

Header 10 also comprises a plurality of strips 38 that are placed in between the header and gate 14 to protect gate 14 and header 10 from wear caused by the shifting of the gate. As shown in FIG. 5, strips 38 engage the rear surface of gate 14 to facilitate horizontal sliding of the gate across header 10. Strips 38 may be formed from any durable, resilient material such as plastic, rubber, or metal.

A rotatable auger 40 is located forward of gate 14 and coupled therewith. Thus allowing the auger to be shifted with the gate to provide efficient feeding of grain to the appropriate feederhouse passage. Auger 40 is powered by drive section 42 which is mechanically coupled to the combine's main power source.

Header 10, as shown, is provided with two pairs of row units 44 particularly suited for harvesting row crops. However, it is within the scope of the present invention that header 10 be provided with a reel head or different kind of cutting table to harvest crops such as wheat.

Header 10, when attached to a combine, is particularly useful for harvesting multi-crop research plots. The combine for use with header 10 is also physically divided into separate compartments of equal functional capacity. This practice is often referred to as "splitting" a combine and comprises retrofitting a machine designed to harvest a single crop so that it is capable of harvesting two different varieties of grain at a single time without cross-contaminating either grain plot. This modification has typically been applied to either twin rotor systems, or single cylinder systems equipped with a four-row header. This modification involves physically separating the internal components of the combine. Once threshed in one of the separate combine compostrants, the grain can be packaged or immediately analyzed using on-board data collection equipment.

FIG. 9 depicts a field containing several test plots 100-110. The combine with header 10 attached begins harvesting plot 100 which comprises two substantially parallel rows of plants. The harvested grain is cut by row units 44 and delivered to the feederhouse 12 by auger 40. Gate 14 is oriented so that gate opening 31 aligns with passage 16. As the combine moves forward across plot 100, all harvested grain is directed into passage 16.

After plot 100 is harvested, the combine enters alley 112. Header 10 may be equipped with a sensor (not shown) that detects a condition, such as an interruption of incoming grain or the presence of a gap between plots, and causes cylinder 32 to be actuated thereby shifting gate 14 to a second position. Alternatively, the combine may employ a GPS system which causes gate 14 to shift at a predetermined location or the combine operator may manually actuates a control thereby causing gate 14 to shift to the second position. In this second position, gate opening 31 is aligned with feederhouse passage 18 and gate 14 blocks access to passage 16, thus being in position to direct all harvested grain from plot 102 through passage 18 and into the corresponding compartment of the combine.

The combine then enters plot 102 and begins harvesting grain and directing grain through passage 18. Also, while harvesting grain from plot 102, the combine finishes threshing the grain harvested from plot 100 and performs any packaging or on-board analysis thereof. Upon completion of harvesting plot 102, the side of the combine corresponding to feederhouse passage 16 is ready to process additional grain. Therefore, when the combine enters another alleyway, gate 14 can be shifted back into the first position whereby opening 31 is once again aligned with passage 16 and access to passage 18 is blocked. While the next plot is harvested, the grain from plot 102 is threshed and analyzed or packaged. This process can continue indefinitely until the entire field is harvested.

Header 10 allows for the combine to operate at a constant speed throughout the field without requiring stopping the forward progress thereof through the field, and without stopping the movement of any internal parts within the header or combine. This eliminates the need for clutches within the header to stop auger rotation and also avoids contamination risks by the build up of grain within the header.

Figure 6:
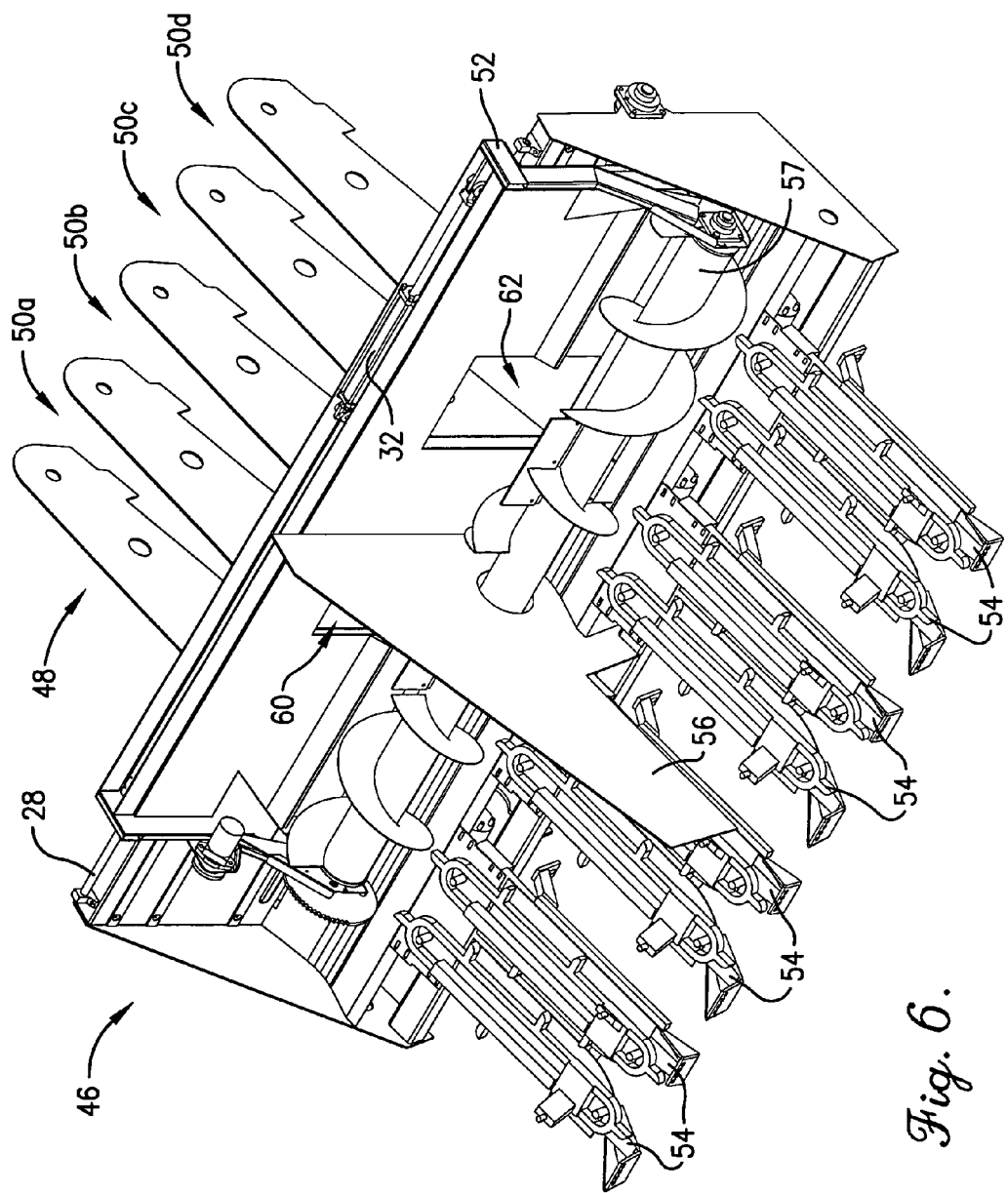
FIG. 6 is a front perspective view of a four-row combine header in accordance with the present invention with the gate in a first position.

FIG. 6 depicts a four-row header 46 constructed in accordance with the present invention. Header 46 is similar in many respects to header 10 discusses previously, however, header 46 is configured to harvest two, two-row plots simultaneously instead of one, two-row plot. Header 46 generally comprises a feederhouse 48 that is divided into four passages 50*a-d* and a shuttle gate 52. The housing to feederhouse 48 has been removed for ease of illustration. Header 46 is outfitted with four pairs of row units 54 and a partition 56 separating two pairs of row units 54 from the other two pairs of row units. Partition 56 is shown fixedly secured to the body of header 46; however, it may be possible to configure header 46 so as to secure partition 56 to gate 52 without interfering with the harvesting of grain by row units 54 as gate 52 is shifted. Auger 57 passes through partition 56 through an orifice in the partition.

Gate 52 presents two rectangularly shaped openings 60 and 62 formed therein. As shown in FIG. 6, gate 52 is oriented so that opening 60 communicates with passage 50*b* and opening 62 communicates with passage 50*d*. FIG. 7 is a rear view of header 46 with gate 52 in the same orientation of FIG. 6. FIG. 8 is a rear view of header 46 showing gate 52 shifted to a second position. In this second position, opening 60 now communicates with passage 50*a* and opening 62 now communicates with passage 50*c*. It is also within the scope of the invention to equip a combine with two independent gate and auger assemblies such as those illustrated in FIGS. 1-4 thereby allowing for harvesting of four rows simultaneously.

Harvesting with header 46 occurs much in the same fashion as with header 10. However, header 46 can harvest plots 100 and 104 simulatneously, keeping grain harvested from each plot separate. Also, the combine used in connection with header 46 is split into four compartments for separately handling grain from up to four different plots. Upon reaching alleyway 112, gate 52 is shifted, thus blocking access to the feederhouse passages and the corresponding combine compartments in which the grain from plots 100 and 104 is being processed. Plots 102 and 106 are then harvested and threshed in yet additional separate compartments within the combine.

EXAMPLE

The following example provides a time savings comparison between a conventional method of harvesting a field of test plots and a method according to the present invention. Both the conventional harvester and a split combine including a two-row header according to the present invention are traveling at approximately 1.2 mph through the individual plots. Each plot presents a length of 17.5 ft., with the alley between plots measuring 2.5 ft. The distance between crop row centers is 30 in. Thus, the plot size (including the alley) is 100.0 sq. ft., giving approximately 435 plots per acre. Using a conventional harvesting method, the combine must pause for 15 seconds in the alley to ensure that grain from the previous plot has been completely processed. The combine equipped with the present header, does not need to pause in the alley and spends approximately 1.42 seconds therein.

Table 1 shows the time savings using the header according to the present invention for a number of different acreage.

TABLE 1

| | | Total Time (hours) | |
|---|---|---|---|
| Acres | Plots | Conventional | Shuttle header |
| 5 | 2175 | 16.4 | 6.8 |
| 10 | 4350 | 32.9 | 13.7 |
| 20 | 8700 | 65.9 | 27.4 |

Harvesting with a split combine and the shuttle header of the present invention can be completed in approximately 60% less time than conventional harvesting methods.

I claim:

1. A combine header comprising:
a feederhouse assembly that is divided into at least first and second passages by at least one partition;
a rotatable auger; and
a shiftable gate slidably mounted on said header aft of said auger and forward of said feederhouse,
said gate shiftable between a first position wherein said gate covers said first feederhouse passage so as to block access to said first passage and a second position wherein said gate covers said second passage leaving said first passage uncovered.

2. The combine header of claim 1, said rotatable auger being mounted on and shiftable with said gate.

3. The combine header of claim 1, said at least one partition dividing said feederhouse assembly into two, functionally equivalent passages.

4. The combine header of claim 1, said gate shiftably mounted on a bearing rod coupled to said header.

5. The combine header of claim 4, said header further comprising a selectively actuated cylinder for shifting said gate between said first and second positions.

6. The combine header of claim 1, said feederhouse assembly presenting two partitions that divide said feederhouse assembly into four passages, said gate when in said first position blocking access to a first pair of said passages and leaving a second pair of passages uncovered, said gate when in said second position blocking access to said second pair of passages and leaving said first pair of passages uncovered.

7. The combine header of claim 1, said header including a sensor for detecting a condition and causing said gate to shift from said first position to said second position.

8. The combine header of claim 7, said condition being the presence of an alley between grain plots in a field.

9. In combination:
a combine; and
a combine header comprising
a feederhouse assembly that is divided into at least first and second passages by at least one partition;
a rotatable auger; and
a shiftable gate slidably mounted on said header aft of said auger and forward of said feederhouse,
said gate shiftable between a first position wherein said gate covers said first feederhouse passage so as to block access to said first passage and a second position wherein said gate covers said second passage leaving said first passage uncovered.

10. The combination of claim 9, said rotatable auger being mounted on and shiftable with said gate.

11. The combination of claim 9, said gate shiftably mounted on a bearing rod coupled to said header.

12. The combination of claim 11, said header further comprising a selectively actuated cylinder for shifting said gate between said first and second positions.

13. The combination of claim 9, said feederhouse assembly presenting two partitions that divide said feederhouse assembly into four passages, said gate when in said first position blocking access to a first pair of said passages and leaving a second pair of passages uncovered, said gate when in said second position blocking access to said second pair of passages and leaving said first pair of passages uncovered.

14. The combination of claim 9, said at least one partition dividing said feederhouse assembly into two, functionally equivalent passages.

15. The combination of claim 9, said header including a sensor for detecting a condition and causing said gate to shift from said first position to said second position.

16. The combination of claim 15, said condition being the presence of an alley between grain plots in a field.

* * * * *